UNITED STATES PATENT OFFICE.

FRIEDRICH LUDWIG SCHMIDT, OF CHARLOTTENBURG, GERMANY.

PROCESS OF MAKING NITRIC ACID.

No. 928,545.  Specification of Letters Patent.  Patented July 20, 1909.

Application filed September 24, 1908. Serial No. 454,552.

*To all whom it may concern:*

Be it known that I, FRIEDRICH LUDWIG SCHMIDT, a subject of the German Empire, residing at Charlottenburg, Germany, have invented a certain new and useful Chemical Process of Making Nitric Acid, of which the following is a specification.

In the production of nitric acid by heating nitrate of sodium with sulfuric acid in retorts and distilling the resulting nitric acid, bisulfate of sodium is obtained as a by-product, which remains in the retorts in a melted condition. If nitrate of calcium, which can now be easily procured, is employed, sulfate of calcium is obtained which remains in the retorts in a compact form on distilling the nitric acid. Further, as is well known, decompositions occur in distilling the nitric acid as the result of overheating, nitrous vapors being formed, the recovery of which entails great expense and considerable labor.

I have found, that the first distillation of the nitric acid may be omitted, since the sulfate of calcium formed by the decomposition of nitrate of calcium by sulfuric acid is almost insoluble in the concentrated nitric acid obtained and that by filtering or pressing the reaction product, or subjecting it to centrifugal action, nitric acid is obtained which is almost free from calcium salts. I have further found that nitrate of calcium can be dissolved by concentrated nitric acid, and that in this solution of nitrate of calcium the transformation with sulfuric acid takes place much more easily. Such a solution can be converted even in the cold with a theoretical quantity of sulfuric acid. If the mixture is warmed, the conversion takes place more quickly. Moreover the nitric acid produced in this manner from solutions of calcium nitrate in concentrated nitric acid, can be obtained almost free from calcium salts by simple pressing. By using crystallized nitrate of calcium or nitrate of calcium more or less free from water, and by employing more or less concentrated sulfuric acid, to which $SO_3$ may be added if desired, highly concentrated nitric acid may be obtained. If pure nitrate of calcium be used for the reaction, the nitric acid obtained will be technically pure. If however the nitrate of calcium contains impurities such as magnesia or other salts, some of these enter into the nitric acid. But even this nitric acid containing small quantities of such impurities is immediately applicable for most industrial purposes. Such nitric acid, containing magnesia, can easily be purified by distillation. Moreover, if it is required to obtain chemically pure nitric acid by employing calcium nitrate containing magnesia, the new process with subsequent distillation is to be preferred to the older process, because nitric acid previously cleared of sulfate of calcium can be more easily distilled than acid containing such sulfate of calcium. In the latter case not only is more heat necessary but losses occur by the decomposition of the nitric acid into nitrous vapors and water as the result of local overheating.

*Examples:*

1. 23.6 kg. crystallized nitrate of calcium is stirred together with sulfuric acid of 66° Bé. equivalent to 9.8 kg. 100% sulfuric acid for several hours. Then the solution is brought up to about 100° C., until a filtered sample is free from calcium. After cooling the nitric acid is separated from the sulfate of calcium by filtration, centrifugal action or pressure and the sulfate of calcium is systematically washed with dilute nitric acid and water.

2. 23.6 kg. crystallized nitrate of calcium is dissolved in 20 kilos nitric acid of 1.4 specific gravity, and treated with 9.8 kg. monohydrate of sulfuric acid. When a sample of the filtrate is almost free from calcium, the nitric acid is separated from the sulfate of calcium by filtration, centrifugal action or pressure and the sulfate of calcium is systematically washed with dilute nitric acid and water.

3. 100 kg. nitrate of calcium is dissolved in 350 kg. nitric acid of 55% strength. To this solution 50 kg. of 95% sulfuric acid are added while stirring, until no more sulfate of calcium is precipitated even by further addition of sulfuric acid. The conversion is complete in a short time. The separated sulfate of calcium precipitates in a hydrated condition at this concentration. The nitric acid of about 59% strength which is obtained, is filtered off and the remaining sulfate of calcium is washed systematically with dilute nitric acid and water. As in this example the sulfate of calcium precipitates in a hydrated state and binds water, the technical effect obtained is to produce from diluted nitric acid a more concentrated acid than about 55%. If nitrate of calcium free from water is employed, a still more dilute nitric acid may be used for dissolving the nitrate of calcium, which dilute acid can be obtained by systematically washing the sulfate of calcium.

What I claim is:

1. The herein described process of making nitric acid which consists by causing sulfuric acid in molecular proportions to react on nitrate of calcium and separating the nitric acid thus obtained from the sulfate of calcium by filtration and afterward washing the sulfate of calcium with dilute nitric acid and water.

2. The herein described process of making nitric acid which consists in dissolving nitrate of calcium in nitric acid, then by causing the dissolved nitrate of calcium to react on sulfuric acid in molecular proportions, separating the nitric acid thus obtained from the sulfate of calcium by filtration and afterward washing the sulfate of calcium with dilute nitric acid and water.

In witness whereof I have hereunto signed my name this fourteenth day of September 1908, in the presence of two subscribing witnesses.

FRIEDRICH LUDWIG SCHMIDT.

Witnesses:
  HENRY HASPER,
  WOLDEMAR HAUPT.